(12) United States Patent
Huang et al.

(10) Patent No.: US 10,596,593 B2
(45) Date of Patent: Mar. 24, 2020

(54) VIBRATION MOTOR

(71) Applicant: AAC Technologies Pte, Ltd., Singapore (SG)

(72) Inventors: Jinquan Huang, Shenzhen (CN); Xiang Xu, Shenzhen (CN); Fanghua Fanghua Ling, Shenzhen (CN); Wenli Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 383 days.

(21) Appl. No.: 15/650,937

(22) Filed: Jul. 16, 2017

(65) Prior Publication Data

US 2018/0297065 A1    Oct. 18, 2018

(30) Foreign Application Priority Data

Apr. 14, 2017    (CN) .......................... 2017 1 0247851

(51) Int. Cl.
| | |
|---|---|
| *H02K 7/065* | (2006.01) |
| *B06B 1/04* | (2006.01) |
| *H02K 33/18* | (2006.01) |
| *H02K 11/20* | (2016.01) |
| *H02K 33/02* | (2006.01) |

(52) U.S. Cl.
CPC ............. *B06B 1/045* (2013.01); *H02K 7/065* (2013.01); *H02K 11/20* (2016.01); *H02K 33/02* (2013.01); *H02K 33/18* (2013.01); *H04M 2250/12* (2013.01); *H04Q 2209/84* (2013.01)

(58) Field of Classification Search
CPC ........ B06B 1/045; H02K 11/20; H02K 33/02; H02K 33/18; H02K 7/065; H04M 2250/12; H04Q 2209/84
See application file for complete search history.

(56) References Cited

U.S. PATENT DOCUMENTS

| | | | | |
|---|---|---|---|---|
| 10,298,105 | B2* | 5/2019 | Kim ..................... | H02K 33/16 |
| 2017/0117789 | A1* | 4/2017 | Mao ..................... | H02K 33/16 |
| 2018/0115230 | A1* | 4/2018 | Mao ..................... | H02K 11/215 |
| 2018/0166965 | A1* | 6/2018 | Mao ..................... | H02K 33/16 |
| 2018/0297062 | A1* | 10/2018 | Huang ................. | B06B 1/045 |
| 2018/0297073 | A1* | 10/2018 | Xu ....................... | H02K 33/16 |

* cited by examiner

*Primary Examiner* — Bernard Rojas
(74) *Attorney, Agent, or Firm* — IPro, PLLC; Na Xu

(57) ABSTRACT

A vibration device, including a shell, a vibrator and a stator accommodated in the shell, and an elastic member. One of the vibrator and the stator includes a magnetic circuit unit while the other one includes a coil. The elastic member includes a first fixing portion fixedly connected with the shell, a first elastic arm and a second elastic arm bending and extending from two opposite ends of the first fixing portion, a second fixing portion extending from an end of the first elastic arm in a direction away from a geometric center of the first fixing portion, and a third fixing portion extending from an end of the second elastic arm in a direction away from the geometric center of the first fixing portion; both the second fixing portion and the third fixing portion are fixedly connected with the vibrator.

8 Claims, 4 Drawing Sheets ative vibration motor in accordance with an exemplary embodiment of the present disclosure.

DESCRIPTION OF EMBODIMENTS

The present disclosure will be further described with reference to the accompanying drawings and embodiments.

Figure 1:
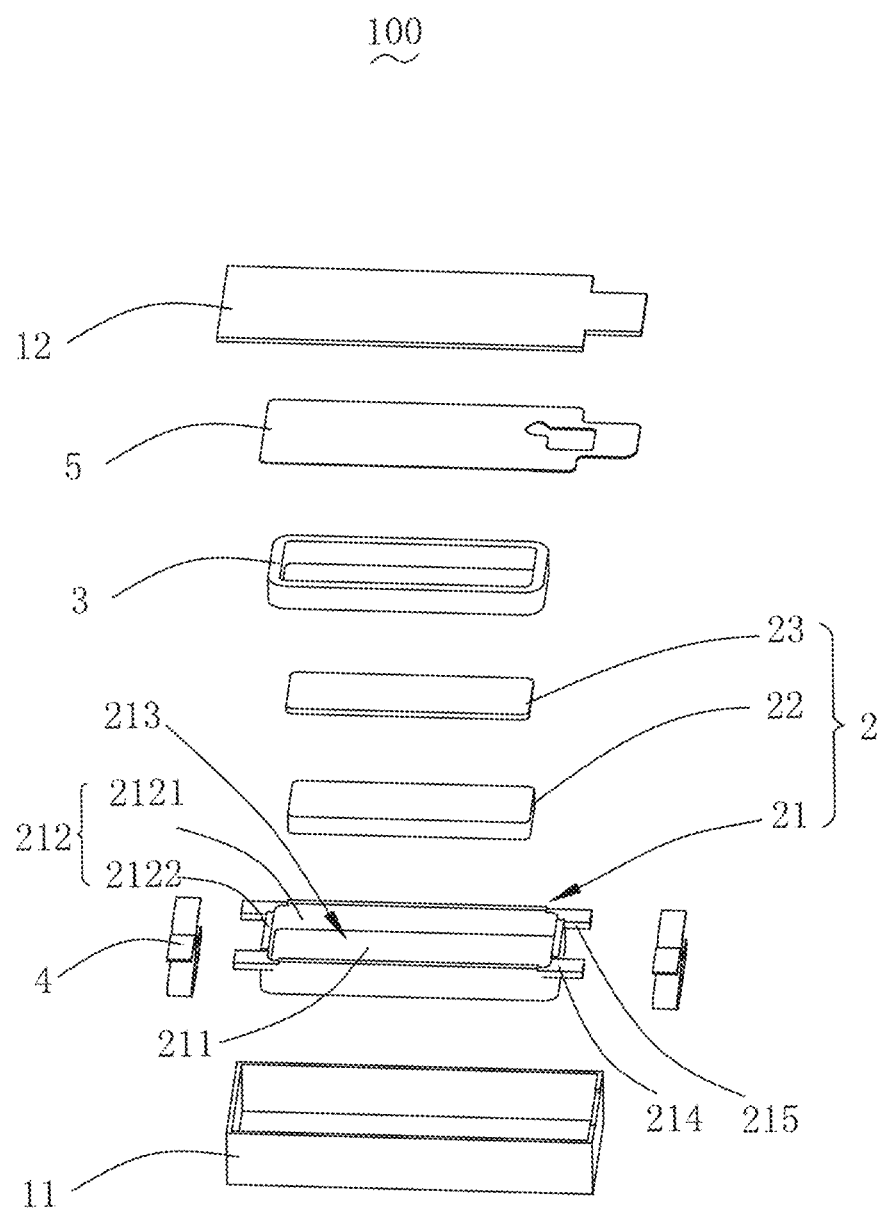
Figure 2:
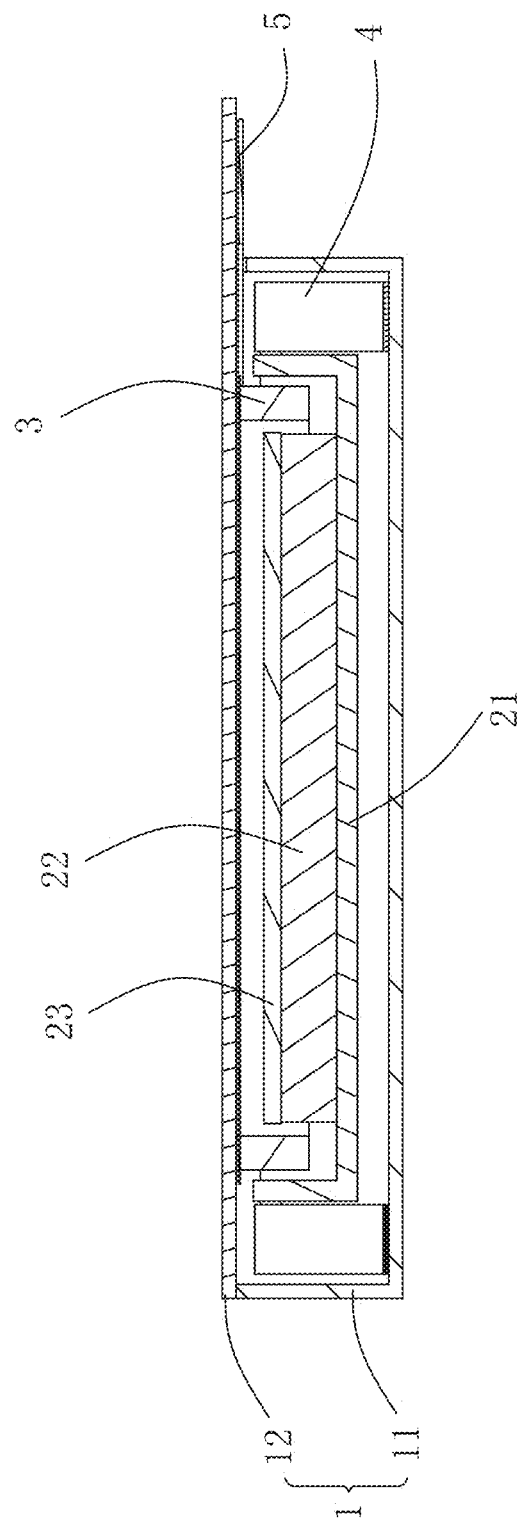

With reference to FIG. 1 and FIG. 2, FIG. 1 is an exploded perspective structural view of a vibration motor in accordance with an exemplary embodiment of the present disclosure; FIG. 2 is a sectional view of a vibration motor in accordance with an exemplary embodiment of the present disclosure. The vibration motor 100 includes a shell 1, a vibrator (not labeled) accommodated in the shell 1, a stator (not labeled) that drives the vibrator to vibrate, an elastic member 4 which suspends the vibrator in the shell 1, and a flexible circuit board 5 fixed in the shell 1.

The shell 1 includes a housing 11 and a cover plate 12 which covers the housing 11.

One of the vibrator and the stator includes a magnetic circuit unit 2, and the other one of the vibrator and the stator includes a coil 3. For ease of description, in an exemplary embodiment, the vibrator consists of the magnetic circuit unit 2, the stator includes the coil 3, the coil 3 interacts with the magnetic circuit unit 2 to drive the vibrator to vibrate. The vibration motor 100 further includes a flexible circuit board 5 fixed to the cover plate 12 and electrically connected with the coil 3, the coil 3 is fixed with the flexible circuit board 5.

The magnetic circuit unit 2 includes a yoke 21, a magnet 22 accommodated in and fixed to the yoke 21, and a pole plate 23 fixed to a side of the magnet 22 close to the coil 3. The coil 3 is electrically connected with the flexible circuit board 5. The coil 3 is fixed to the shell 1 by the flexible circuit board 5 and is surrounding the magnet 22.

The yoke 21 includes a bottom wall 211 and a side wall 212 bending and extending along the bottom wall 211, the bottom wall 211 and the side wall 212 together form an accommodating cavity 213. The magnet 22 is fixed on the bottom wall 211 and the magnet 22 is spaced from the side wall 212 to form a magnetic gap. The coil 3 is inserted into the magnetic gap.

The side wall 212 includes a pair of first side walls 2121 arranged symmetrically along a long axis direction and a pair of second side walls 2122 arranged symmetrically along a short axis direction. The first side wall 2121 is connected with the second side wall 2122. Two elastic members 4 are provided and respectively connected with a corresponding second side wall 2122. A first extending portion 214 and a second extending portion 215 extend from each first side wall 2121 in a direction to the shell 1, and the first extending portion 214 and the second extending portion 215 are spaced from each other.

Figure 3:
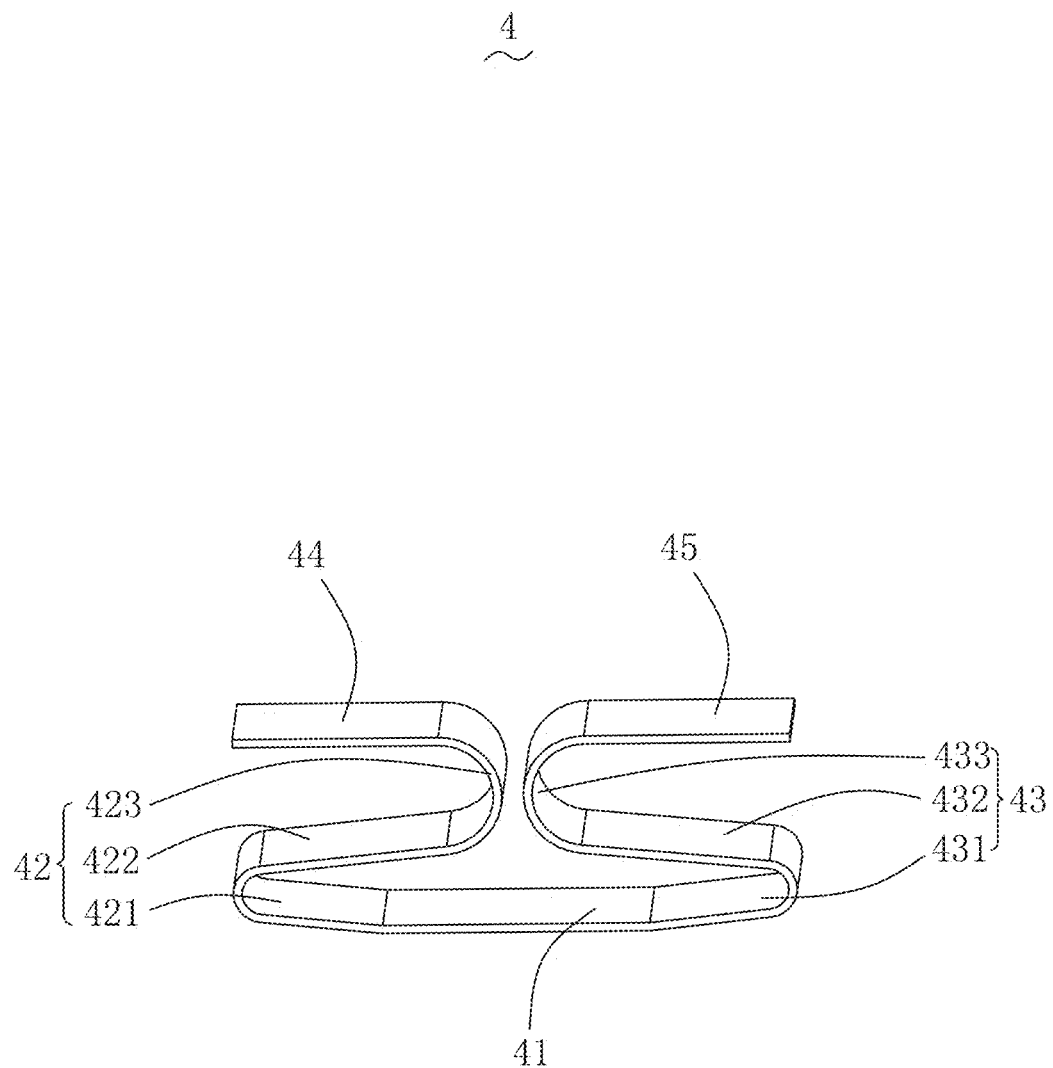

With reference to FIG. 3, the FIG. 3 is a perspective view of an elastic member of a vibration motor in accordance with an exemplary embodiment of the present disclosure. The elastic member 4 includes a first fixing portion 41 fixedly connected with the shell 1, a first elastic arm 42 and a second elastic arm 43 bending and extending from two opposite ends of the first fixing portion 41, a second fixing portion 44 extending from an end of the first elastic arm 42 in a direction away from a geometric center of the first fixing portion 41, and a third fixing portion 45 extending from an end of the second elastic arm 42 in a direction away from the geometric center of the first fixing portion 41. The second fixing portion 44 and the third fixing portion 45 are both fixedly connected with the vibrator. The first elastic arm 42 and the second elastic arm 43 are spaced from each other to form an opening.

The first elastic arm 42 includes a first deforming portion 421 connected with the first fixing portion 41 and extending in a direction away from the geometric center of the first fixing portion 41, a second deforming portion 422 extending from the first deforming portion 421 in a direction close to the geometric center of the first fixing portion 41, and a third deforming portion 423 extending from the second deforming portion 422 in the direction away from the geometric center of the first fixing portion 41.

The second elastic arm 43 includes a fourth deforming portion 431 connected with the first fixing portion 41 and extending in a direction away from the geometric center of the first fixing portion 41, a fifth deforming portion 432 extending from the fourth deforming portion 431 in a direction close to the geometric center of the first fixing portion 41, and a sixth deforming portion 433 extending from the fifth deforming portion 432 in a direction away from the geometric center of the first fixing portion 41. By configuring the first elastic arm 42 and the second elastic arm 43 into the above-described structure, on the one hand, space at two ends of the yoke 21 can be sufficiently utilized and an arm of force of the elastic member 4 can be extended; on the other hand, toughness of the elastic member 4 can be strengthened, and service life of the elastic member 4 can be effectively improved. Thus, when the vibration motor 100 vibrates, a first stage modal of the elastic member 4 is largely different from a second stage modal of the elastic member 4, and the elastic member 4 is firmly fixed with the vibrator, which brings good stability for the vibration motor 100.

An arc transition is provided between the first deforming portion 421 and the second deforming portion 422, between the second deforming portion 422 and the third deforming portion 423, between the fourth deforming portion 431 and the fifth deforming portion 432, and between the fifth deforming portion 432 and the sixth deforming portion 433. By configuring the arc transition, the problem of easily breaking of the junction area due to stress concentration can be avoided.

In an exemplary embodiment, the second fixing portion 44 and the third fixing portion 45 are arranged in parallel to and spaced from the first fixing portion 41, the second deforming portion 421 and the fifth deforming portion 432 are obliquely arranged with respect to the first fixing portion 41.

Figure 4:
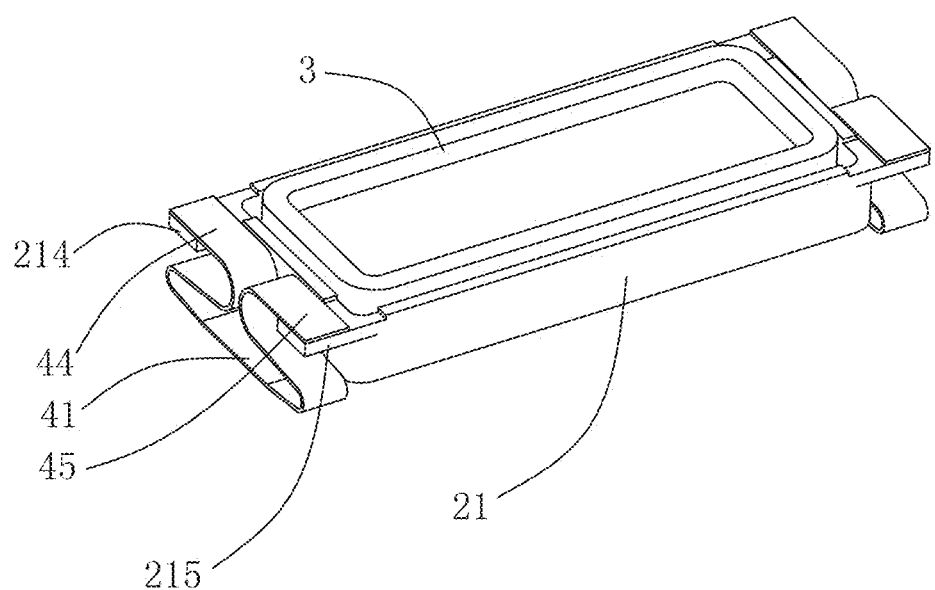

With reference to FIG. 4, the FIG. 4 is a partial structural schematic view of a vibration motor in accordance with an exemplary embodiment of the present disclosure. The first fixing portion 41 is fixed to the shell 1 by welding. The second fixing portion 44 and the third fixing portion 45 are fixed to the yoke 21 by welding. Specifically, the second fixing portion 44 is fixedly connected with the first extending portion 214, and the third fixing portion 45 is fixedly connected with the second extending portion 215.

Compared with the related technology, in the vibration motor of the present disclosure, by respectively fixing the second fixing portion and the third fixing portion located at two ends of the elastic member to the vibrator and, at the same time, fixing the first fixing portion to the shell, so that the elastic member can be firmly fixed with the vibrator, thereby allowing the vibration of the vibration motor to be stable. When the vibration motor vibrates, the first elastic arm and the second elastic arm located at two ends of the first fixing portion are elastically deformed at the same time, and the first stage modal of the elastic member is largely different from the second stage modal of the elastic member, which brings good stability to the vibration motor.

It should be noted that, the above are merely embodiments of the present invention, those skilled in the art can make improvements without departing from the inventive concept of the present invention, however, these improvements shall belong to the protection scope of the present invention.

What is claimed is:

1. A vibration motor, comprising:
a shell,
a vibrator accommodated in the shell,
a stator accommodated in the shell, and
an elastic member suspending the vibrator in the shell,
wherein the vibrator comprises a magnetic circuit unit, the stator comprises a coil, the magnetic circuit unit comprises a yoke having an accommodating cavity, a magnet accommodated in and fixed to the accommodating cavity, the coil is fixed to the shell and is surrounding the magnet the yoke comprises a bottom wall and a side wall bending and extending along the bottom wall, the bottom wall and the side wall together form the accommodating cavity, the magnet is fixed on the bottom wall, and the magnet is spaced from the side wall to form a magnetic gap, and the coil is inserted into the magnetic gap,
wherein the elastic member comprises a first fixing portion fixedly connected with the shell, a first elastic arm and a second elastic arm bending and extending from two opposite ends of the first fixing portion, a second fixing portion extending from an end of the first elastic arm in a direction away from a geometric center of the first fixing portion, and a third fixing portion extending from an end of the second elastic arm in a direction away from the geometric center of the first fixing portion; both the second fixing portion and the third fixing portion are fixedly connected with the yoke.

2. The vibration motor as described in claim 1, wherein the first elastic arm comprises a first deforming portion connected with the first fixing portion and extending in a direction away from the geometric center of the first fixing portion, a second deforming portion extending from the first deforming portion in a direction close to the geometric center of the first fixing portion, and a third deforming portion extending from the second deforming portion in a direction away from the geometric center of the first fixing portion;
the second elastic arm comprises a fourth deforming portion connected with the first fixing portion and extending in a direction away from the geometric center of the first fixing portion, a fifth deforming portion extending from the fourth deforming portion in a direction close to the geometric center of the first fixing portion, and a sixth deforming portion extending from the fifth deforming portion in a direction away from the geometric center of the first fixing portion.

3. The vibration motor as described in claim 2, wherein an arc transition is provided between the first deforming portion and the second deforming portion, between the second deforming portion and the third deforming portion, between the fourth deforming portion and the fifth deforming portion, and between the fifth deforming portion and the sixth deforming portion.

4. The vibration motor as described in claim 2, wherein the second fixing portion and the third fixing portion are respectively arranged in parallel to and spaced from the first fixing portion, the second deforming portion and the fifth deforming portion are obliquely arranged with respect to the first fixing portion.

5. The vibration motor as described in claim 1, wherein the side wall comprises a pair of first side walls arranged symmetrically along a long axis direction and a pair of second side walls arranged symmetrically along a short axis direction, the pair of first side wall is connected with the pair of second side wall; two elastic members are provided and respectively connected with the pair of second side walls.

6. The vibration motor as described in claim 5, wherein each first side wall extends in a direction to the shell to form a first extending portion and a second extending portion, and the first extending portion and the second extending portion are spaced from each other, the second fixing portion is fixedly connected with the first extending portion, and the third fixing portion is fixedly connected with the second extending portion.

7. The vibration motor as described in claim 1, wherein the first fixing portion is fixed to the shell by welding, the second fixing portion and the third fixing portion are fixed to the yoke by welding.

8. The vibration motor as described in claim 1, wherein the vibration motor further comprises a pole plate fixed to a side of the magnet close to the coil; the vibration motor further comprises a flexible circuit board fixed to the shell and electrically connected with the coil, and the coil is fixed to the flexible circuit board.

* * * * *